United States Patent
Sodagar

(10) Patent No.: US 11,509,701 B2
(45) Date of Patent: Nov. 22, 2022

(54) EXTENDED RELATIONSHIP SIGNALING BETWEEN EVENTS IN EVENT MESSAGE TRACKS

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/704,344

(22) Filed: Mar. 25, 2022

(65) Prior Publication Data

US 2022/0337641 A1  Oct. 20, 2022

Related U.S. Application Data

(60) Provisional application No. 63/177,271, filed on Apr. 20, 2021.

(51) Int. Cl.
*H04L 65/61* (2022.01)
*H04L 67/02* (2022.01)

(52) U.S. Cl.
CPC ............. *H04L 65/61* (2022.05); *H04L 67/02* (2013.01)

(58) Field of Classification Search
None
See application file for complete search history.

(56) References Cited

U.S. PATENT DOCUMENTS

| | | | |
|---|---|---|---|
| 10,979,784 B1 * | 4/2021 | Mekuria | H04N 21/8456 |
| 2014/0059180 A1 * | 2/2014 | Giladi | H04L 65/762 |
| | | | 709/219 |
| 2016/0182593 A1 * | 6/2016 | Denoual | H04N 21/2353 |
| | | | 709/219 |
| 2017/0134466 A1 * | 5/2017 | Giladi | H04N 21/26258 |
| 2020/0359086 A1 | 11/2020 | Cava et al. | |
| 2021/0320964 A1 * | 10/2021 | Sodagar | H04N 21/84 |

(Continued)

OTHER PUBLICATIONS

ISO/IEC JTC 1/SC 29/WG 03; N0113; MPEG Systems; Convenorship: KATS (Korea, Republic of); "Event message track format for ISO-BMFF CD"; Jan. 2021, pp. 11.

(Continued)

*Primary Examiner* — Quang N Nguyen
(74) *Attorney, Agent, or Firm* — Sughrue Mion, PLLC

(57) ABSTRACT

Systems, devices, and methods for Dynamic Adaptive Streaming over HTTP (DASH) is provided. A method includes: obtaining an event message track including a plurality of event message instance boxes, the event message track configured to be processed by a DASH client for displaying media content; obtaining a first event message instance box included in the event message track; obtaining a second event message instance box included in the event message track, wherein the second event message instance box includes first information identifying the first event message instance box, and second information specifying a relationship between the first event message instance box and the second event message instance box; modifying the first event message instance box based on the first information and the second information; and providing the event message track to the DASH client or displaying media content based on the event message track.

18 Claims, 5 Drawing Sheets

(56) References Cited

U.S. PATENT DOCUMENTS

2022/0217188 A1* 7/2022 Sodagar .................. H04L 67/02

OTHER PUBLICATIONS

International Search Report dated Jul. 27, 2022 in International Application No. PCT/US2022/022113.
Written Opinion of the International Searching Authority dated Jul. 27, 2022 in International Application No. PCT/US2022/022113.

* cited by examiner

EXTENDED RELATIONSHIP SIGNALING BETWEEN EVENTS IN EVENT MESSAGE TRACKS

CROSS-REFERENCE TO THE RELATED APPLICATIONS

This application claims priority from U.S. Provisional Application No. 63/177,271, filed on Apr. 20, 2021, the disclosure of which is incorporated herein by reference in its entirety.

FIELD

Embodiments of the present disclosure are directed to media streaming and, more particularly, Dynamic Adaptive Streaming over HyperText Transfer Protocol (HTTP) (DASH).

BACKGROUND

ISO/IEC 23009-1 Dynamic Adaptive Streaming over HTTP (DASH) standard introduced events message boxes for carrying events with media segments. Further, ISO/IEC 23001-19 CD defines an Event Message Track format, where a track can carry event messages.

The current Event Message Track specification uses a box for carrying each event instance. The only relationship between two instances that can be signaled in this box is when two event instances are equivalent, i.e. processing one is adequate. However, there are more possible cases for the relation between two event instances.

"Information technology—Coding of audiovisual objects—Part 12: ISO base media file format", ISO/IEC 14496-12 (December 2015), "Draft of FDIS of ISO/IEC 23000-19 Common Media Application Format for Segmented Media", ISO/IEC JTC1/SC29/WG11 MPEG117/ 16819 (April 2017); and "Text of ISO/IEC FDIS 23009-1 4th edition", ISO/IEC JTC 1/SC 29/WG 11 N18609 (August 2019) are incorporated herein by reference in their entirety.

SUMMARY

In embodiments, a method performed by at least one processor includes obtaining an event message track including a plurality of event message instance boxes, the event message track configured to be processed by a Dynamic Adaptive Streaming over HyperText Transfer Protocol (DASH) client for displaying media content; obtaining a first event message instance box included in the event message track; obtaining a second event message instance box included in the event message track, wherein the second event message instance box includes first information identifying the first event message instance box, and second information specifying a relationship between the first event message instance box and the second event message instance box; modifying the first event message instance box based on the first information and the second information; and providing the event message track to the DASH client or displaying media content based on the event message track.

In embodiments, a device includes at least one memory storing program code; and at least one processor configured to read the program code and operate as instructed by the program code, the program code including: first obtaining code configured to cause the at least one processor to obtain an event message track including a plurality of event message instance boxes, the event message track configured to be processed by a Dynamic Adaptive Streaming over HyperText Transfer Protocol (DASH) client for displaying media content; second obtaining code configured to cause the at least one processor to obtain a first event message instance box included in the event message track; third obtaining code configured to cause the at least one processor to obtain a second event message instance box included in the event message track, wherein the second event message instance box includes first information identifying the first event message instance box, and second information specifying a relationship between the first event message instance box and the second event message instance box; modifying code configured to cause the at least one processor to modify the first event message instance box based on the first information and the second information; and providing code configured to cause the at least one processor to provide the event message track to the DASH client or display media content based on the event message track.

In embodiments, a non-transitory computer-readable medium stores instructions that, when executed by at least one processor, cause the at least one processor to: obtain an event message track including a plurality of event message instance boxes, the event message track configured to be processed by a Dynamic Adaptive Streaming over HyperText Transfer Protocol (DASH) client for displaying media content; obtain a first event message instance box included in the event message track; obtain a second event message instance box included in the event message track, wherein the second event message instance box includes first information identifying the first event message instance box, and second information specifying a relationship between the first event message instance box and the second event message instance box; modify the first event message instance box based on the first information and the second information; and provide the event message track to the DASH client or display media content based on the event message track.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
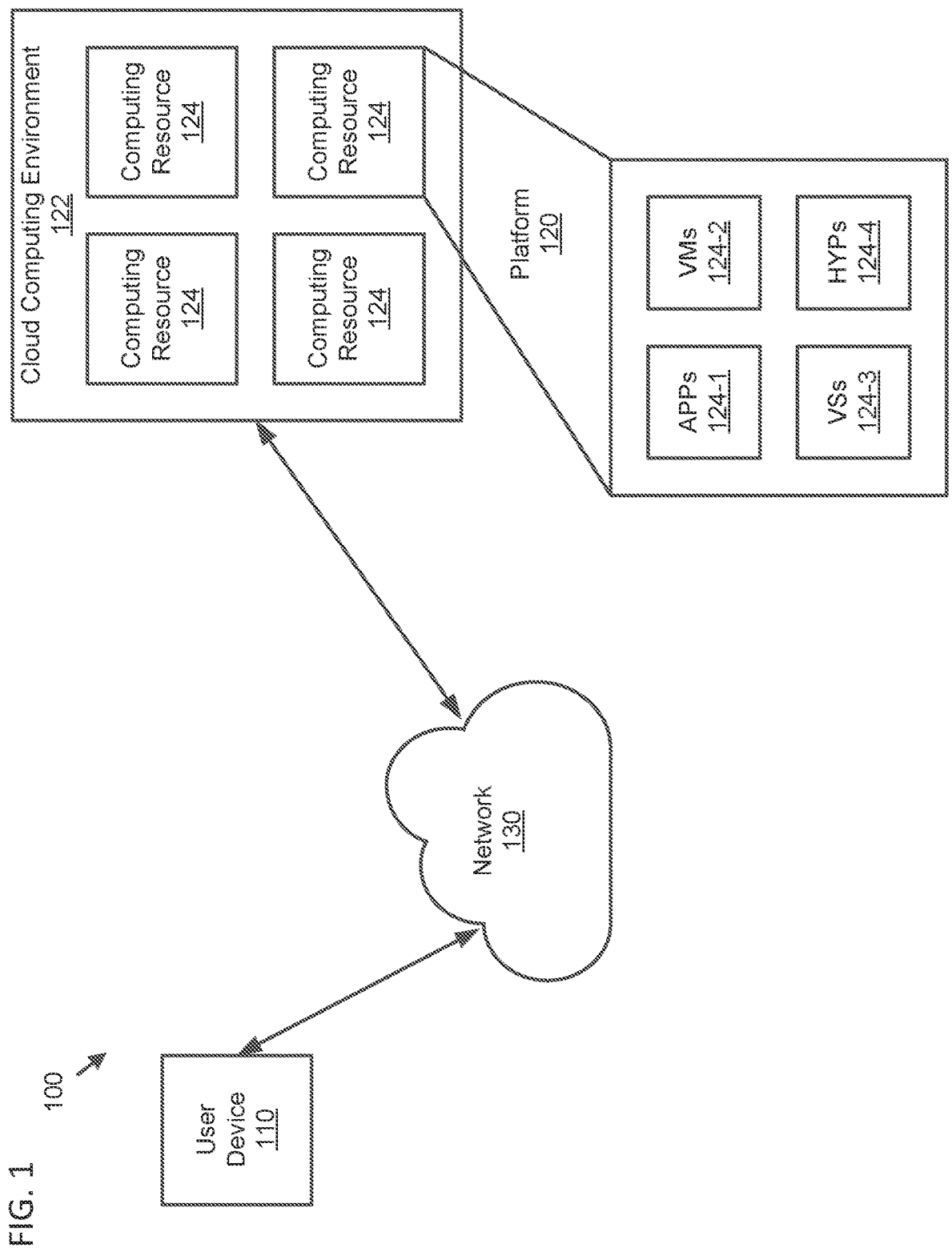
FIG. 1 is a diagram of an environment in which methods, apparatuses and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
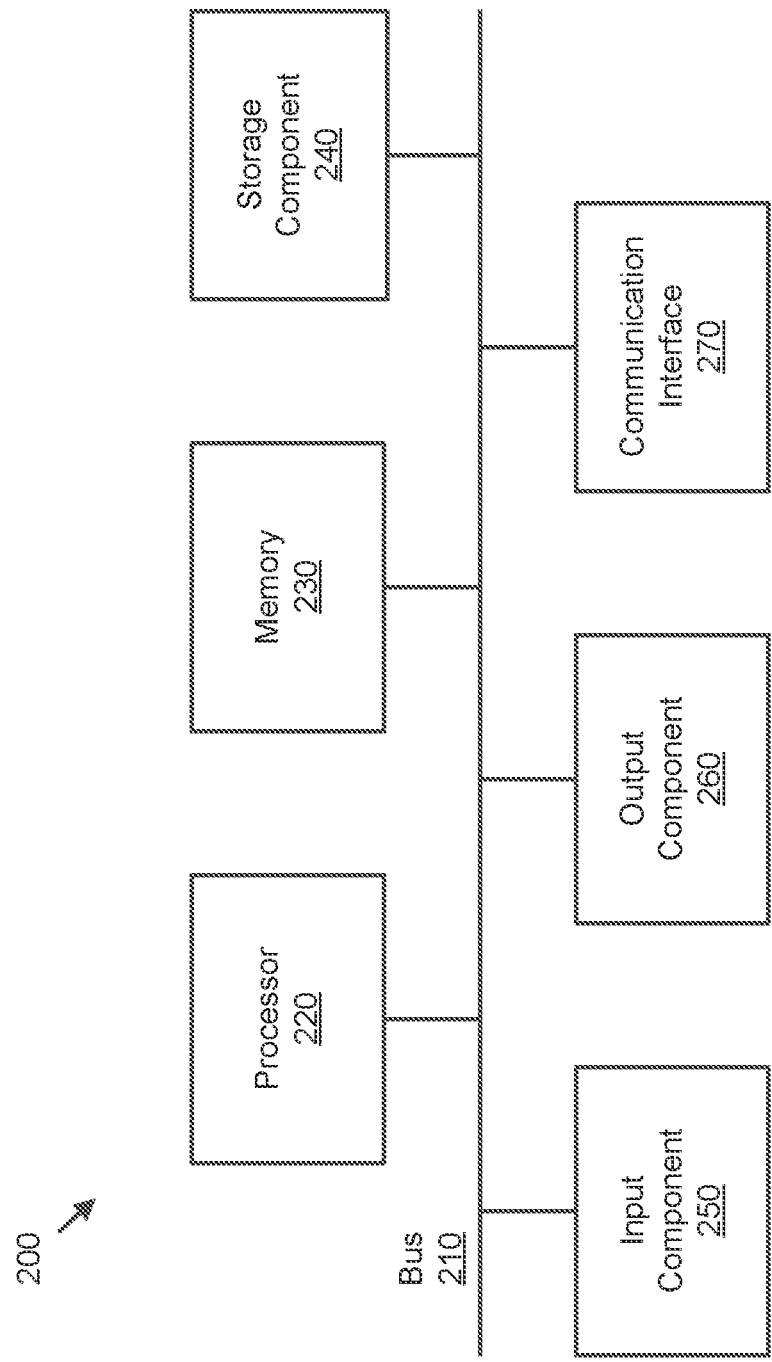
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally. or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
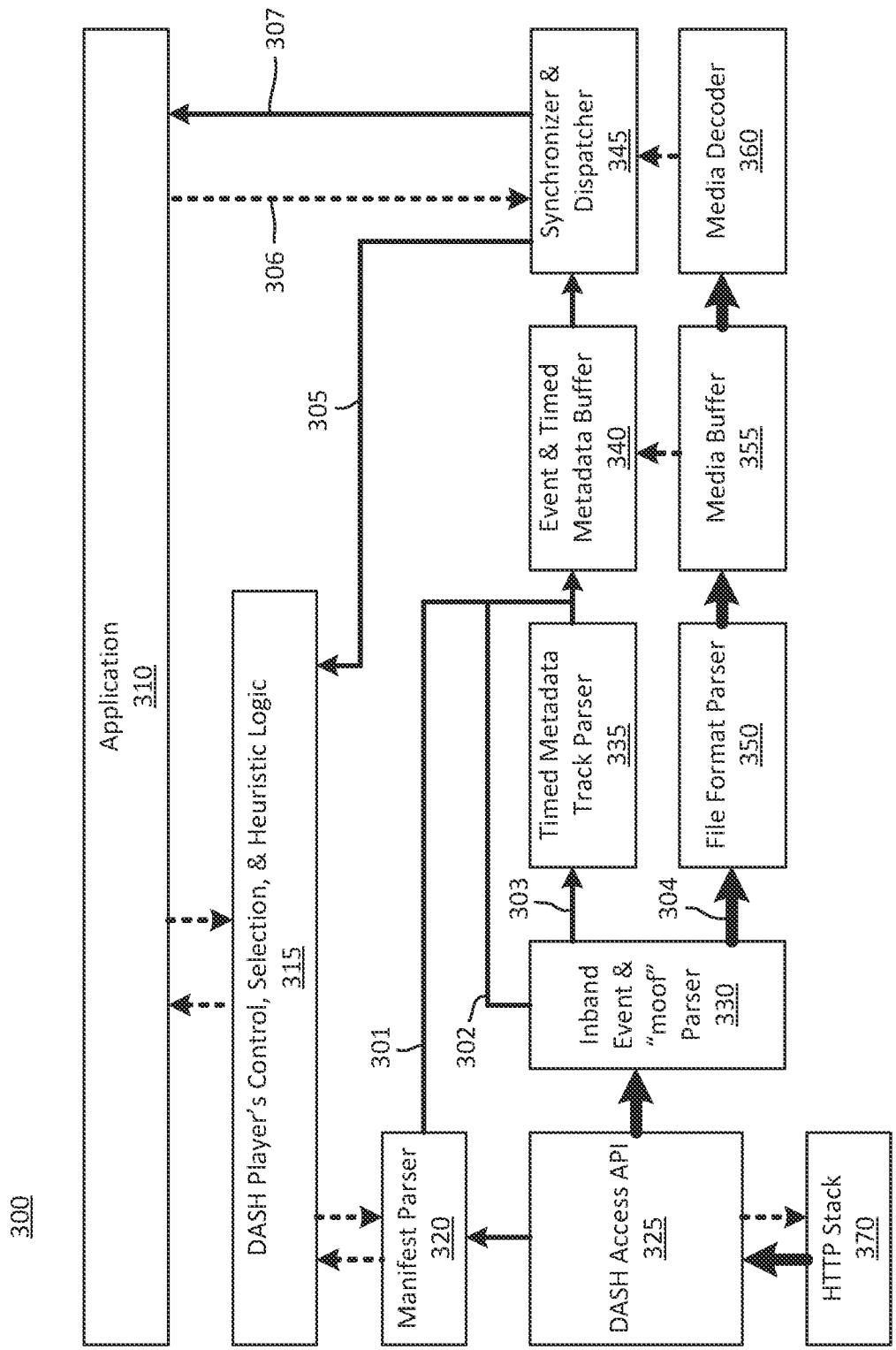
FIG. 3 is a diagram of a DASH client according to embodiments.

FIG. 3 illustrates an example DASH client 300 that is configured to process Media Presentation Description (MPD) events 301, inband events 302, and sparse timed metadata track events, according to embodiments of the present disclosure. The DASH client 300 can also be used for processing Common Media Application Format (CMAF) events. According to an embodiment, the DASH client 300 may be implemented by the user device 100 of FIG. 1.

Events may be provided in order to signal aperiodic information to the DASH client 300 or to an application. Events may be timed (e.g. each event starts at a specific media presentation time and may have a duration). Events may include DASH specific signaling or application-specific events. DASH events may be identified by scheme identifiers. For application specific events, a scheme identifier may identify the application such that the DASH client 300 can forward the event to the proper application.

As shown in FIG. 3, the DASH client 300 may include an application 310, a DASH player's control, selection, & heuristic logic 315, a manifest parser 320, a DASH access API 325, an inband event & "moof" (movie fragment box) parser 330, a timed metadata track parser 335, an event & timed metadata buffer 340, a synchronizer & dispatcher 345, a file format parser 350, a media buffer 355, a media decoder 360, and an HTTP stack 370.

In FIG. 3, the broken lines represent control and/or synchronization; the regular, solid lines represent event and/or timed metadata flow; and the bold, solid lines represent media data flow. The control and/or synchronization may include, for example, a subscription function 306 and an event/metadata API 307. The event and/or timed metadata flow may include, for example, the MPD events 301, the inband events 302, the timed metadata 303, and the DASH events 305. The media data flow may include, for example, media segments 304.

The DASH client 300 may receive a manifest, such as MPDs, and may process them. The manifest may describe a combination and synchronization of independently packaged CMAF tracks grouped in CMAF switching sets and selection sets to form a synchronized multimedia presentation. The manifest may provide the DASH client 300 with information to select, initialize, start align, and synchronize the CMAF track(s) to be played, and identify CMAF media objects (e.g. CMAF headers, CMAF chunks, and CMAF fragments) as resources to access and to possibly download them. CMAF tracks and CMAF fragments may contain sufficient information to enable decryption, decoding, and presentation scheduling. The manifest can also provide information on delivery protocol, network management, authorization, license acquisition, etc., in addition to resource identification and presentation description. The manifest can also signal that tracks conform to a CMAF media profile.

For reference, a CMAF fragment may be a media object that is encoded and decoded. A CMAF fragment may include one or more pairs of a movie fragment box ('moof') and a media data box ('mdat'). Each pair of 'moof' and 'mdat' may be referred to as a CMAF chunk, and each CMAF chunk may contain a consecutive subset of media samples belonging to a CMAF fragment.

A CMAF track may be a continuous sequence of one or more CMAF fragments in presentation order conforming to a CMAF media profile, and an associated CMAF header. The CMAF header may contain a MovieBox that is sufficient to process and present all CMAF fragments in the CMAF track. A CMAF track may be produced by an encoder and an ISOBMFF file packager, but may be made to be accessible in the form of CMAF addressable media objects that can be references as resources defined by an external media application specification.

The DASH client 300 may request media segments based on described addresses in the manifest. The manifest may also describe metadata tracks. The DASH client 300 can also access the segment of metadata tracks, parse them, and send them to the application.

Also, of addresses for media segments, a DASH manifest may provide addressed for Index segments. Each index segment may provide information about one segment duration and size. A Representation Index may provide the index information for all segments of a given representation.

According to embodiments, the manifest parser 320 may parse MPD events 301 from the manifest, and append them to the event & timed metadata buffer 340. Based on the MPD, the DASH client 300 may manage the fetching and parsing of Segments from the HTTP stack 370. The parsing of the Segments may be performed by the inband event & "moof" parser 330. The inband event & "moof" parser may parse media segments 304 from the Segments before appending them to the media buffer 355. The parsing by the inband event & "moof" parser 330 may also include parsing inband events 302 and timed metadata 303 (e.g., timed metadata tracks) from the Segments. Also, the timed metadata track parser 335 may parse and append high-level boxes such as event message boxes of the timed meta data 303 and event message instance boxes of the timed meta data 303 to the event & timed metadata buffer 340.

The event & timed metadata buffer 340 may pass the events and timed metadata samples to the synchronizer & dispatcher 345, which may be referred to as an event & timed metadata synchronizer & dispatcher function.

The synchronizer & dispatcher 345 may dispatch DASH client 300 specific events to the DASH player's control, selection, & heuristic logic 315. If the application 310 is subscribed to a specific event(s) and/or timed metadata stream(s), the synchronizer & dispatcher 345 may dispatch the corresponding event instances and/or timed metadata samples to the application 310 via the event/metadata API 307.

Embodiments may provide a method for signaling the relationship between event instances in one event message track. Accordingly, embodiments may extend the event message instance box to signal the more extended relationship between them.

In embodiments, the event message instance box can be extended to signal a more extensive relationship between event instances. For example, in embodiments, the event message instance box may be used to signal that:

1. One event instance is an update of the previous one(s)
2. Timing change: the start and/or duration of the previous event is changed.
3. The event is canceled and no further processing is necessary
4. Reserving bits for further extensions In embodiments, and event message instance box may be extended as follows:

```
aligned(8) class EventMessageInstanceBox
    extends FullBox('emib', version, flags=0){
    unsigned int(32) reserved=0;
    signed int(64) presentation_time_delta;
    unsigned int(32) duration;
    unsigned int(32) id;
    unsigned int(32) update_id;
    unsigned int(32) update_mode;
    string scheme_id_url;
    string value;
    unsigned int(8)message_data[ ];
}
```

In the extended event message instance box as shown above:
update_id: may indicate that the new instance is an update of the previous instance(s) with the identical value of this field.
update_mode: each value may define a specific relationship with the previous instance. For example:
  0: may indicate replacement, such that the new event replaces the previous event
  1: changes of timing, i.e. the start and/or of the event have been updated.
  2: cancelation: may indicate that this event instance cancels the previous instance, i.e. previous instance does not need to be processed.

Accordingly, embodiments, may provide a method of signaling a more extended relationship, for example a relationship beyond equivalency, between the event instances in the event message track, wherein one or more event instances may be linked together using a unique new identifier for updating, and another field may show the relationship including replacement, change of timing, and cancelation, wherein when an event message instance is detected that is an update to the previous instance(s), the client may only process the updated instance or correct the previously processed ones.

Figure 4:
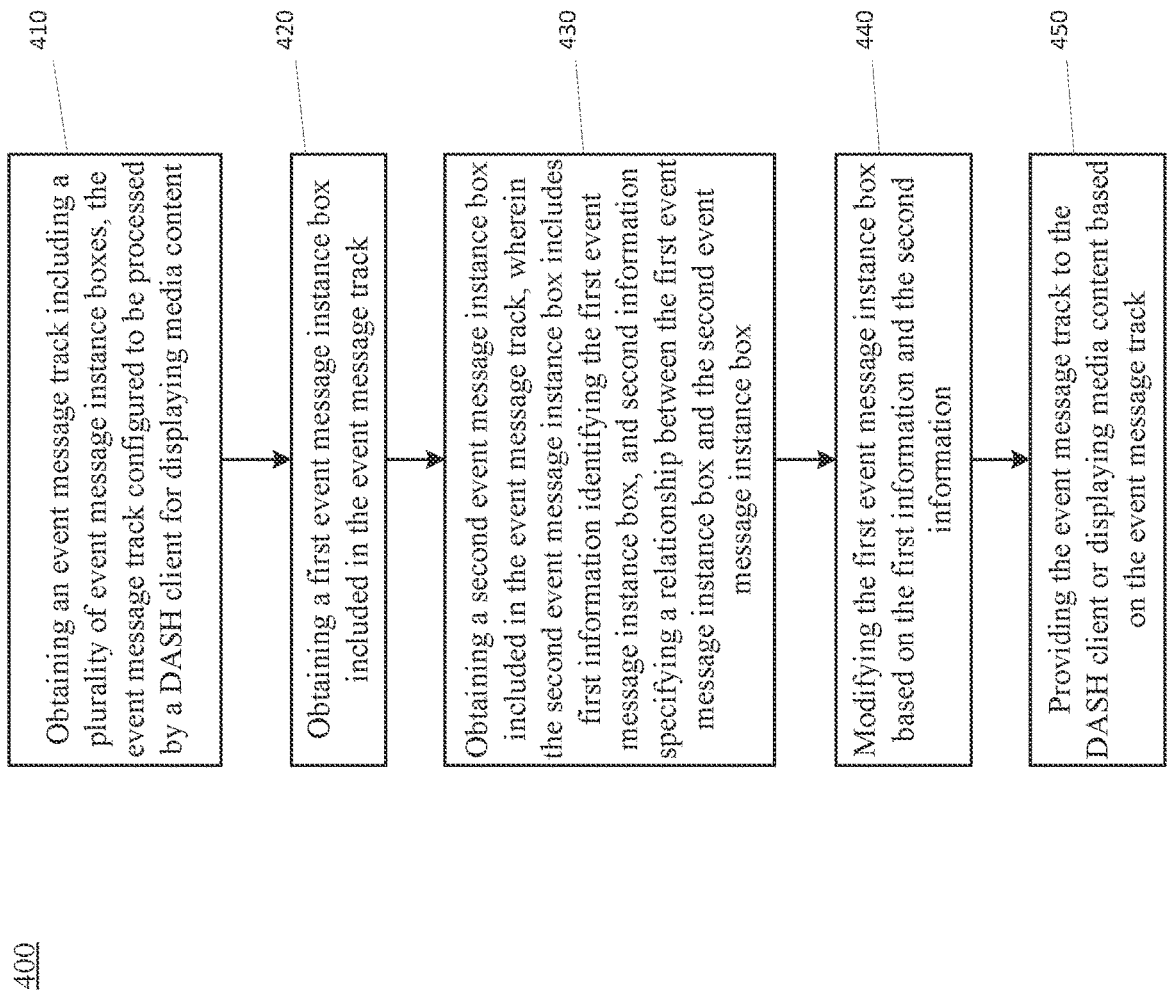
FIG. 4 is a diagram of a process according to embodiments.

FIG. 4 is a flow chart of an example process 400 for managing a media streaming system that includes the DASH client 300. In some implementations, one or more process blocks of FIG. 4 may be performed by user device 441. In some implementations, one or more process blocks of FIG. 4 may be performed by another device or a group of devices separate from or including user device 110, such as platform 120.

As shown in FIG. 4, process 400 may include obtaining an event message track including a plurality of event message instance boxes, the event message track configured to be processed by a Dynamic Adaptive Streaming over HyperText Transfer Protocol (DASH) client for displaying media content (block 410).

As further shown in FIG. 4, process 400 may include obtaining a first event message instance box included in the event message track (block 420).

As further shown in FIG. 4, process 400 may include obtaining a second event message instance box included in the event message track, wherein the second event message instance box includes first information identifying the first event message instance box, and second information specifying a relationship between the first event message instance box and the second event message instance box (block 430).

As further shown in FIG. 4, process 400 may include modifying the first event message instance box based on the first information and the second information (block 440).

As further shown in FIG. 4, process 400 may include providing the event message track to the DASH client or displaying media content based on the event message track (block 440).

In embodiments, the first event message instance box may include an identifier, and the first information may include an update identifier, and process 400 may further include determining that the first event message instance box is related to the second event message instance box based on a value of the identifier being equal to a value of the update identifier.

In embodiments, the second information may include a value indicating a type of the relationship between the first event message instance box and the second event message instance box.

In embodiments, based on the value being a first value, the second information indicates that the relationship has a first relationship type, based on the value being a second value, the second information indicates that the relationship has a second relationship type, and based on the value being a third value, the second information indicates that the relationship has a third relationship type.

In embodiments, the first relationship type may be a replacement relationship, and based on the value being the first value, the modifying of the first event message instance box may include replacing the first event message instance box in the event message track with the second event message instance box.

In embodiments, the second relationship type may be a timing change relationship, and based on the value being the second value, the modifying of the first event message instance box may include changing at least one of a start time corresponding to the first event message instance box, or an end time corresponding to the first event message instance box.

In embodiments, the third relationship type may be a cancelation relationship, and based on the value being the third value, the modifying of the first event message instance box may include canceling the first event message instance box from the event message track.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
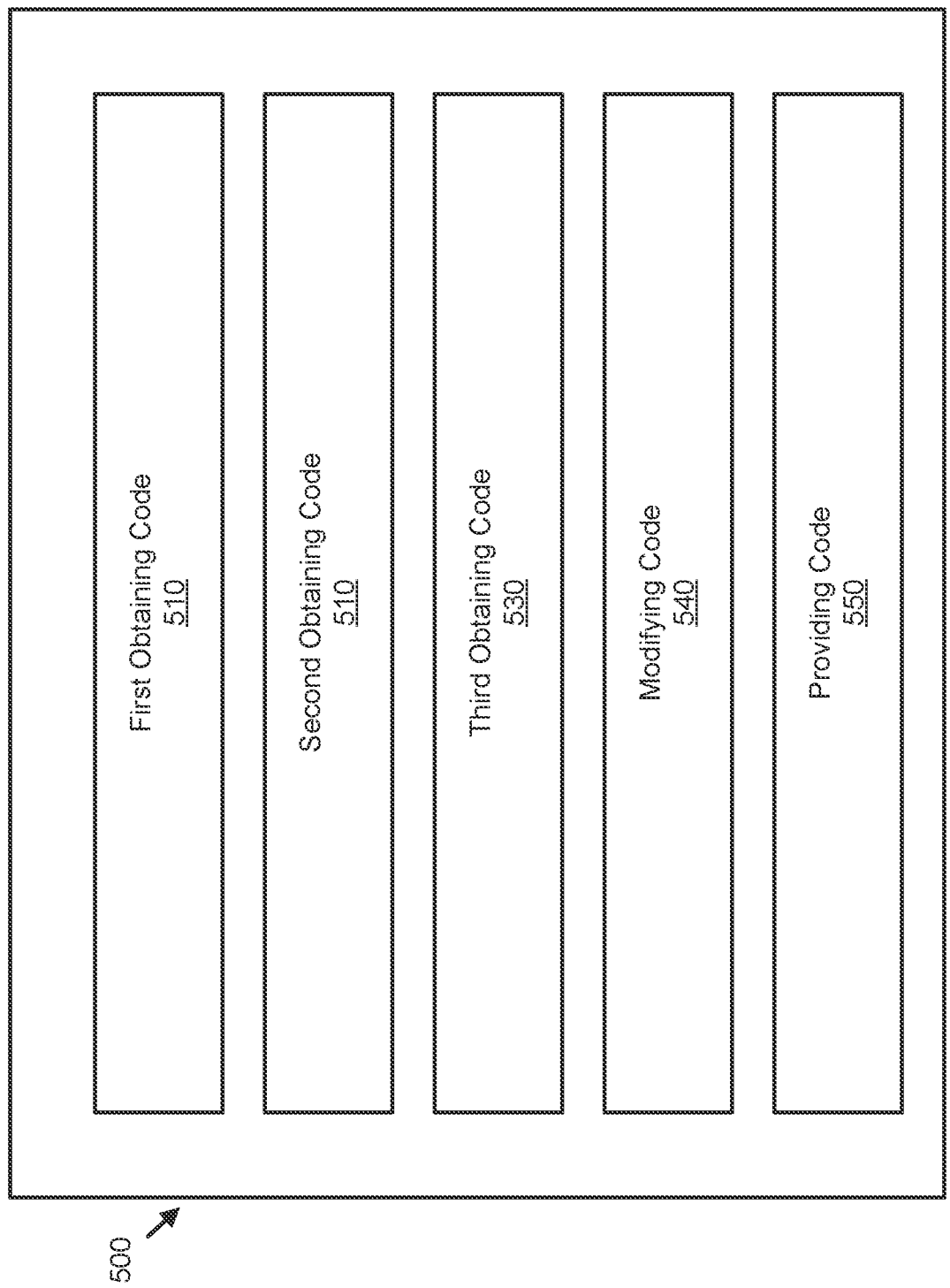
FIG. 5 is a diagram of computer code according to embodiments.

With reference to FIG. 5, computer code 500 according to embodiments is described. The computer code 500 may performed by a media streaming system that includes the DASH client 300. For example, the media streaming system may be implemented by the environment 100 described with respect to FIG. 1. The media streaming system may comprise memory configured to store computer code 500, and at least one processor configured to access the computer code 500 and operate as instructed by the computer code 500. The computer code 500 may be distributed amongst memory of different components of the media streaming system (e.g. servers, clients, etc.) and may be configured to cause the at least one processor of the specific component to perform any number of their functions, including the functions described in the present disclosure. For example, the computer code 500 may comprise any number of first obtaining code 510, second obtaining code 520, third obtaining code 530, modifying code 540, and providing code 550.

In embodiments, the first obtaining code 510, second obtaining code 520, third obtaining code 530, modifying code 540, and providing code 550 may be configured to cause the media streaming system that includes the DASH client 300 to perform the aspects of the process described above with reference to FIG. 4, respectively.

The embodiments of the present disclosure may be used separately or combined in any order. Further, each of the methods, servers, and clients may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
obtaining an event message track including a plurality of event message instance boxes, the event message track configured to be processed by a Dynamic Adaptive Streaming over HyperText Transfer Protocol (DASH) client for displaying media content, the plurality of event message instance boxes corresponding to a plurality of events comprising one or more of Media Presentation Description (MPD) events, inband events, timed metadata, Common Media Application Format (CMAF) events, and DASH events;

obtaining a first event message instance box included in the event message track, wherein the first event message instance box comprises an identifier;

obtaining a second event message instance box included in the event message track, wherein the second event message instance box includes first information identifying the first event message instance box, and second information specifying a relationship between the first event message instance box and the second event message instance box;

modifying the first event message instance box based on the first information and the second information; and providing the event message track to the DASH client or displaying media content based on the event message track, wherein the first information comprises an update identifier, and wherein the method further comprises determining that the first event message instance box is related to the second event message instance box based on a value of the identifier being equal to a value of the update identifier.

2. The method of claim 1, wherein the second information includes a value indicating a type of the relationship between the first event message instance box and the second event message instance box.

3. The method of claim 2, wherein based on the value being a first value, the second information indicates that the relationship has a first relationship type, wherein based on the value being a second value, the second information indicates that the relationship has a second relationship type, and wherein based on the value being a third value, the second information indicates that the relationship has a third relationship type.

4. The method of claim 3, wherein the first relationship type is a replacement relationship, and wherein, based on the value being the first value, the modifying of the first event message instance box comprises replacing the first event message instance box in the event message track with the second event message instance box.

5. The method of claim 3, wherein the second relationship type is a timing change relationship, and wherein, based on the value being the second value, the modifying of the first event message instance box comprises changing at least one of a start time corresponding to the first event message instance box, or an end time corresponding to the first event message instance box.

6. The method of claim 3, wherein the third relationship type is a cancelation relationship, and wherein, based on the value being the third value, the modifying of the first event message instance box comprises canceling the first event message instance box from the event message track.

7. A device comprising:

at least one memory storing program code; and at least one processor configured to read the program code and operate as instructed by the program code, the program code including:

first obtaining code configured to cause the at least one processor to obtain an event message track including a plurality of event message instance boxes, the event message track configured to be processed by a Dynamic Adaptive Streaming over HyperText Transfer Protocol (DASH) client for displaying media content, the plurality of event message instance boxes corresponding to a plurality of events comprising one or more of Media Presentation Description (MPD) events, inband events, timed metadata, Common Media Application Format (CMAF) events, and DASH events;

second obtaining code configured to cause the at least one processor to obtain a first event message instance box included in the event message track, wherein the first event message instance box comprises an identifier;

third obtaining code configured to cause the at least one processor to obtain a second event message instance box included in the event message track, wherein the second event message instance box includes first information identifying the first event message instance box, and second information specifying a relationship between the first event message instance box and the second event message instance box;

modifying code configured to cause the at least one processor to modify the first event message instance box based on the first information and the second information; and providing code configured to cause the at least one processor to provide the event message track to the DASH client or display media content based on the event message track, wherein the first information comprises an update identifier, and wherein the modifying code is further configured to cause the at least one processor to determine that the first event message instance box is related to the second event message instance box based on a value of the identifier being equal to a value of the update identifier.

8. The device of claim 7, wherein the second information includes a value indicating a type of the relationship between the first event message instance box and the second event message instance box.

9. The device of claim 7, wherein based on the value being a first value, the second information indicates that the relationship has a first relationship type, wherein based on the value being a second value, the second information indicates that the relationship has a second relationship type, and wherein based on the value being a third value, the second information indicates that the relationship has a third relationship type.

10. The device of claim 9, wherein the first relationship type is a replacement relationship, and wherein, based on the value being the first value, the modifying code is further configured to cause the at least one processor to replace the first event message instance box in the event message track with the second event message instance box.

11. The device of claim 9, wherein the second relationship type is a timing change relationship, and wherein, based on the value being the second value, the modifying code is further configured to cause the at least one processor to change at least one of a start time corresponding to the first event message instance box, or an end time corresponding to the first event message instance box.

12. The device of claim 9, wherein the third relationship type is a cancelation relationship, and wherein, based on the value being the third value, the modifying code is further configured to cause the at least one processor to cancel the first event message instance box from the event message track.

13. A non-transitory computer-readable medium storing instructions that, when executed by at least one processor, cause the at least one processor to:
    obtain an event message track including a plurality of event message instance boxes, the event message track configured to be processed by a Dynamic Adaptive Streaming over HyperText Transfer Protocol (DASH) client for displaying media content, the plurality of event message instance boxes corresponding to a plurality of events comprising one or more of Media Presentation Description (MPD) events, inband events, timed metadata, Common Media Application Format (CMAF) events, and DASH events;
    obtain a first event message instance box included in the event message track, wherein the first event message instance box comprises an identifier;
    obtain a second event message instance box included in the event message track, wherein the second event message instance box includes first information identifying the first event message instance box, and second information specifying a relationship between the first event message instance box and the second event message instance box;
    modify the first event message instance box based on the first information and the second information; and
    provide the event message track to the DASH client or display media content based on the event message track,
    wherein the first information comprises an update identifier, and
    wherein the method further comprises determining that the first event message instance box is related to the second event message instance box based on a value of the identifier being equal to a value of the update identifier.

14. The non-transitory computer-readable medium of claim 13, wherein the second information includes a value indicating a type of the relationship between the first event message instance box and the second event message instance box.

15. The non-transitory computer-readable medium of claim 14, wherein based on the value being a first value, the second information indicates that the relationship has a first relationship type,
    wherein based on the value being a second value, the second information indicates that the relationship has a second relationship type, and
    wherein based on the value being a third value, the second information indicates that the relationship has a third relationship type.

16. The non-transitory computer-readable medium of claim 15, wherein the first relationship type is a replacement relationship, and
    wherein, based on the value being the first value, the modifying of the first event message instance box comprises replacing the first event message instance box in the event message track with the second event message instance box.

17. The non-transitory computer-readable medium of claim 15, wherein the second relationship type is a timing change relationship, and
    wherein, based on the value being the second value, the modifying of the first event message instance box comprises changing at least one of a start time corresponding to the first event message instance box, or an end time corresponding to the first event message instance box.

18. The non-transitory computer-readable medium of claim 15, wherein the third relationship type is a cancelation relationship, and
    wherein, based on the value being the third value, the modifying of the first event message instance box comprises canceling the first event message instance box from the event message track.

* * * * *